Sept. 29, 1970    HANS-HEINRICH CLASSEN    3,531,051
DEVICE FOR AERATING THE WATER JET EMERGING FROM
A SPIGOT OR THE LIKE
Filed March 6, 1968    2 Sheets-Sheet 1
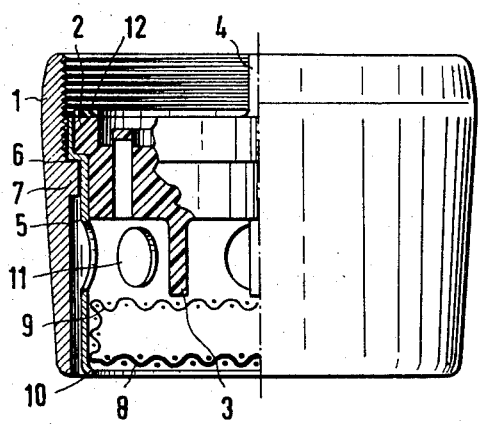
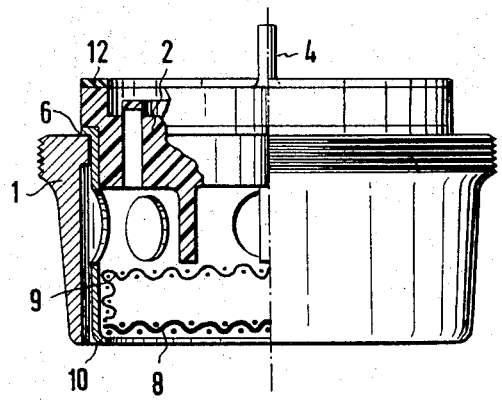
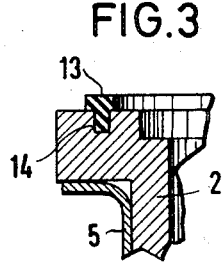
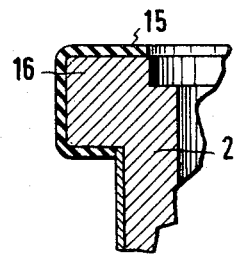
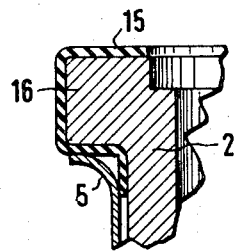
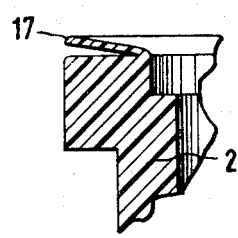
INVENTOR.
HANS-HEINRICH CLASSEN
BY *Robert R. Jacob*
AGT.

Sept. 29, 1970  HANS-HEINRICH CLASSEN  3,531,051
DEVICE FOR AERATING THE WATER JET EMERGING FROM
A SPIGOT OR THE LIKE
Filed March 6, 1968  2 Sheets-Sheet 2

INVENTOR.
HANS-HEINRICH CLASSEN
BY
Robert H Jacob.
AGT.

United States Patent Office 3,531,051
Patented Sept. 29, 1970

3,531,051
DEVICE FOR AERATING THE WATER JET EMERGING FROM A SPIGOT OR THE LIKE
Hans-Heinrich Classen, Lobberich (Rhine), Germany, assignor to Firma Rokal G.m.b.H., Lobberich (Lower Rhine), Germany
Filed Mar. 6, 1968, Ser. No. 710,988
Claims priority, application Germany, Mar. 10, 1967, R 34,674
Int. Cl. E03c 1/08
U.S. Cl. 239—428.5                                                5 Claims

ABSTRACT OF THE DISCLOSURE

Aerating device comprising an outer sleeve, a transverse perforated wall in the upper part of the sleeve, a double screen below the upper wall, which elements form a unitary assembly, and a sealing element at the upper end of the wall.

BACKGROUND OF THE INVENTION

The invention relates to aerating devices and is particularly concerned with a device for aerating the water jet discharged from a water spout or spigot.

In accordance with the invention an improvement is provided in a device for aerating the water stream discharged by a spigot or the like, where a perforated transverse wall is arranged in a housing and, at a distance below the same, mixing screens or the like, and where the transverse wall and mixing screens are combined into an assembly unit by means of a sleeve. Such aerating devices possess the characterizing feature that they consist merely of two parts, namely the housing which is mounted threadedly or otherwise on the outlet end of a water spigot or spout, and the assembly unit constituted by the transverse wall, the sleeve and the mixing screens. The assembly unit can therefore be readily removed and reinstalled for the purpose of cleaning or for the purpose of replacement by a new unit.

In known aerating devices of this type the transverse wall consisted of plastic material which seals without difficulty with respect to the metallic opposite sealing surface of the water outlet of the spigot. However, this type of sealing requires a relatively accurately finished and undamaged clean sealing surface at the water outlet. In the event that the requirement of a sealing surface which is so accurate cannot be met, another manner of sealing must be employed.

SUMMARY OF THE INVENTION

It is an object of the invention to provide a new type of seal in known forms of construction of aerating devices which does not require an accurately finished and undamaged clean sealing surface, while at the same time not adversely affecting the characteristic feature of these aerating devices which resides in the two-part construction. This problem is solved in accordance with the invention essentially in that an additional sealing member is secured to the transverse wall. This sealing member may, for example, or preferably, consist of a softer material than the transverse wall or may in its structural form possess greater resiliency than the transverse wall. Generally, in accordance with the invention, the additional advantage is obtained that with respect to the selection of the material for the transverse wall there exists greater freedom of choice, and it is not necessary to take special precautions to obtain the necessary sealing effect. As a result the transverse wall may also consist, for example, of metal or metal parts.

In particular, the improvement in accordance with the invention may be realized in various ways. For example, in accordance with the invention an additional sealing ring may be glued to the upper end of the transverse wall. On the other hand, an embodiment of the invention is provided where on the top side of the transverse wall a seal is impressed in a groove in connection with which it is also possible to provide additional gluing in the groove.

In accordance with further embodiments of the invention the additional sealing member may also be in the form of a ring of U-shaped cross section and may encompass an outer shoulder of the transverse wall. In this connection the construction may also be such that the U-shaped sealing body is clamped in between the transverse wall and the sleeve connecting the transverse wall and the screens. Finally, forms of construction are possible where a sealing lip is formed at the top side of the transverse wall.

BRIEF DESCRIPTION OF THE DRAWINGS

Further details and advantages of the invention will become apparent from the following description with reference to the drawings, where the invention is explained in connection with several embodiments. All of the embodiments incorporate the feature of the invention that the transverse wall, the screens and sleeve define an assembly unit which may be made of plastic material. In the drawings:

FIG. 1 is an embodiment of the invention having a housing provided with an inner thread, FIG. 2 shows a further embodiment with a housing having an outer thread, FIG. 3 shows a different form of construction of the seal in a recess in the transverse wall, FIGS. 4 to 6 show three further embodiments of the invention also with a recess or cutout in the transverse wall.

DESCRIPTION OF PREFERRED EMBODIMENTS

Figure 7:
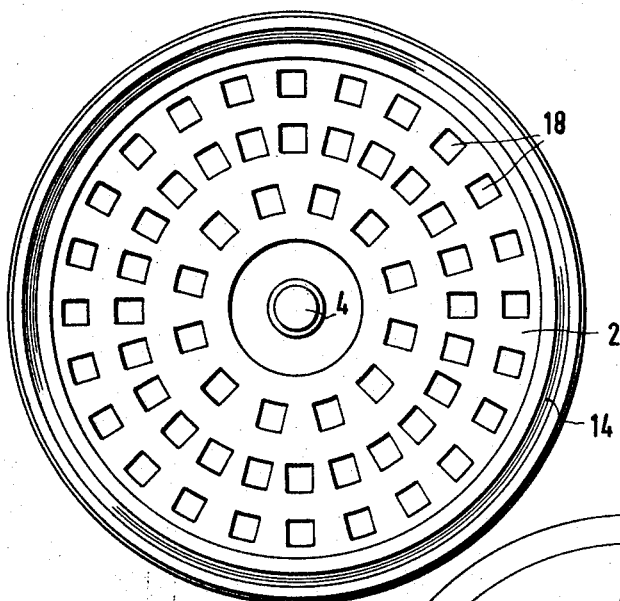
FIGS. 7 to 9 illustrate a top view, a bottom view and a section of the transverse wall.

In the illustrations the housing of the aerating device is indicated at 1, which is preferably of metal and which in the embodiment in accordance with FIG. 1 can be connected by means of an inner thread to the outer thread of a spigot, not shown. The perforated transverse wall 2 is preferably of plastic material which at its bottom is provided, for example, with three supports 3 and at its top surface with a stud 4. The transverse wall 2 is pressed into a sleeve 5 of metal, but preferably in such a manner that, if need be, it can be separated from the sleeve 5 for cleaning purposes. The sleeve 5 has an annular flange 6 resting on a shoulder 7 of the housing 1 on which flange also rests the transverse wall 2. The sleeve is thus held in suspension while leaving free an annular space for the admission of air, which takes place from the bottom to the top between the inner wall of the housing 1 and the outer wall of the sleeve. In the bottom part of the sleeve 5 a flat relatively coarse screen 8 and a pot-shaped finer screen 9 are pressed in and are held at the bottom by a small inner bead 10. The sleeve furthermore is provided with air admission apertures 11.

Figure 8:
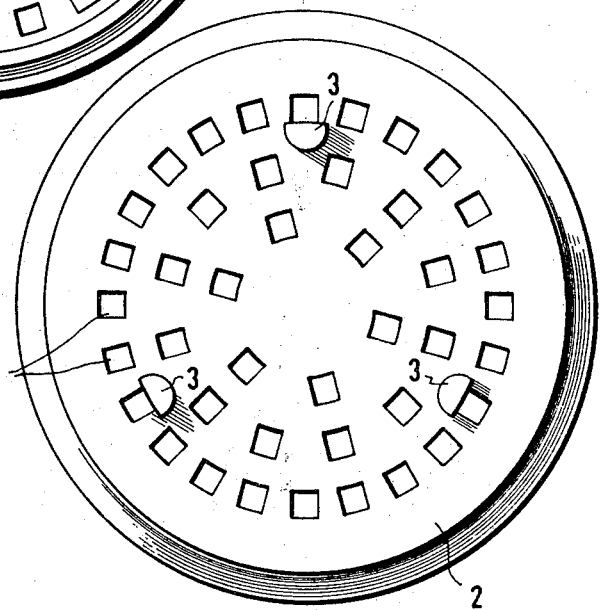
Figure 9:
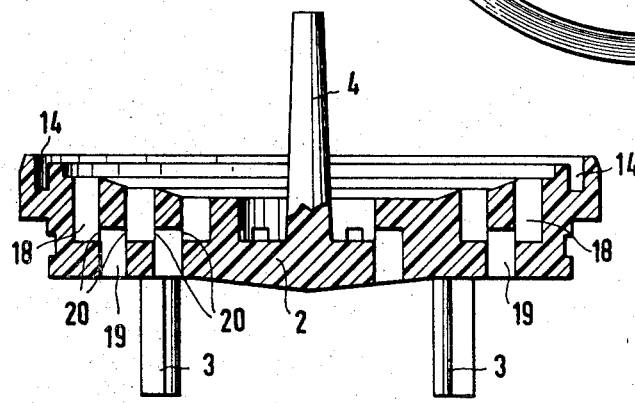

As illustrated in FIGS. 7 to 9 the transverse wall has a plurality of recesses 18, which extend downwardly from the top, and 19, which extend upwardly from the bottom. These recesses 18 and 19 are disposed in concentric circles in such a manner that the circles 19 are within the circles of the recesses 18. The arrangement is such that the recesses 18 and 19 meet inside the transverse wall and in this manner define apertures 20 which connect recesses 18 and 19 with one another. In this manner vertical passages are defined in the transverse wall 2 which are of importance for the function of the device, because the water flowing in a closed stream from above the transverse wall 2 is divided by these passages 18, 19 and 20 into individual jets which precipitate onto the screens 8, 9, where they are divided.

In the embodiment in accordance with FIGS. 1 and 2 the air enters from the bottom between the inner wall 1 of the housing and the sleeve 5 and passes through the apertures 11 in the sleeve into the space above the screens 8 and 9 to the individual jets of water that are formed between passages 18, 19 in the transverse wall 2. This air is mixed with water jets in the space above the screens 8, 9 and in the screens and the mixture becomes a foamy and aerated stream of water which exits below the screens 8, 9 and which is permeated with numerous air bubbles, is soft and does not spray.

In the embodiment in accordance with FIG. 2 the annular flange 6 of the sleeve is supported by the upper ledge of the housing 1 which is provided with an outer thread. In both the embodiments FIGS. 1 and 2 a sealing ring 12 is glued onto the top side of the transverse wall 2, which as the housing is threaded to the spigot engages the metallic sealing surface of the water discharge end of the spigot and seals it. Particular requirements regarding the accurate forming and undamaged condition of this engagement surface need therefore not be met. Furthermore, the threading of the housing to the tap in order to obtain the sealing effect does not require much force which could result in the wearing of the material of the transverse wall.

In the embodiment in accordance with FIG. 3 the upper end of the transverse wall 2 is provided with a sealing ring 13 that is pressed into a groove 14. This sealing ring may additionally be fastened by gluing.

FIGS. 4 and 5 show two embodiments of the invention where the additional seal 15 is of U-shaped cross section and disposed around an upper annular portion 16 of the transverse wall 2. In the embodiment in accordance with FIG. 5 the sealing member 15 is additionally wedged in between the transverse wall 2 and the sleeve 5.

FIG. 6 illustrates an embodiment of the invention where the transverse wall 2 that is formed of plastic has a sealing lip 17 formed thereon which, due to its manner of construction and disposition, provides a resilient sealing effect.

The transverse wall illustrated in FIG. 7 has an annular groove 14 at its outer edge and thus corresponds to the embodiment in accordance with FIG. 3. However, as reflected by FIG. 9, the sealing ring 13 is not required in this embodiment of the invention, because the upwardly extending outer wall of the groove 14 can engage the inner surface of the spigot and provide a seal.

The stud 4 serves for manipulating the inserting of the transverse wall 2 into the sleeve 5 or for manipulating the unit defined by the sleeve 5, screens 8, 9 and the transverse wall 2. The projections 3 provided on the bottom of the transverse wall 2 limit the movement of the sceens 8, 9 towards the top.

Having now described my invention with reference to the embodiment illustrated in the drawings, what I desire to protect by Letters Patent of the United States is set forth in the appended claims.

I claim:
1. Device for aerating a water jet discharged by a spigot or the like comprising a one piece housing adapted to be fastened to a water outlet, a shoulder in said housing intermediate the upper and lower ends thereof, a one piece sleeve received in said housing and having a flange supported by said shoulder, a transverse wall received in the upper part of said sleeve and having perforations, mixing screens disposed in said sleeve below said transverse wall and spaced from said wall, said sleeve, said transverse wall and said screens constituting a unitary structure, said sleeve being spaced from said housing and having apertures to permit the passage of air, and said transverse wall having an upper portion extending outwardly and seated on said flange and having a sealing member at the upper end to seal against said outlet.

2. Device in accordance with claim 1, comprising an annular groove defined in the upper surface of said upper portion and said sealing member is a sealing ring disposed in said groove.

3. Device in accordance with claim 1 where said sealing element is in the form of a U-shaped ring encompassing said upper portion.

4. Device in accordance with claim 1, where said sealing member is a sealing lip defined in the upper outer portion of said transverse wall.

5. Device for aerating a water jet discharged by a spigot or the like comprising a one piece housing adapted to be fastened to a water outlet, a shoulder in said housing intermediate the upper and lower ends thereof, a one piece sleeve received in said housing and having a flange supported by said shoulder, a transverse wall received in the upper part of said sleeve and having perforations, mixing screens disposed in said sleeve below said transverse wall and spaced from said wall, said sleeve, said transverse wall and said screens constituting a unitary structure, said sleeve being spaced from said housing and having apertures to permit the passage of air, and said transverse wall having an upper portion extending outwardly and seated on said flange and having a sealing member at the upper end in the form of a lip projecting above the upper outer portion of said transverse wall within the upper end of said housing for engagement with said water outlet.

References Cited

UNITED STATES PATENTS

| | | | |
|---|---|---|---|
| 2,774,584 | 12/1956 | Aghnides | 239—428.5 |
| 2,962,225 | 11/1960 | Aghnides | 239—428.5 |
| 2,989,249 | 6/1961 | Richter | 239—428.55 X |
| 2,998,933 | 9/1961 | Aghnides | 239—428.5 |
| 3,151,787 | 10/1964 | Miller | 222—542 X |
| 3,180,534 | 4/1965 | Duda et al. | 222—542 X |

FOREIGN PATENTS

| | | |
|---|---|---|
| 962,559 | 7/1964 | Great Britain. |
| 362,376 | 7/1962 | Switzerland. |

ROBERT B. LEWIS, Primary Examiner

H. S. LANE, Assistant Examiner